United States Patent [19]

Circelli et al.

[11] Patent Number: 4,765,940
[45] Date of Patent: Aug. 23, 1988

[54] METHOD OF TRANSPORTING AND FORMING TAPERED ENDS ON PIQUETS

[75] Inventors: Peter A. Circelli, Delmar; Adolph K. Praemassing, Earlton, both of N.Y.

[73] Assignee: American Technical Industries, Inc., Pittsburgh, Pa.

[21] Appl. No.: 944,004

[22] Filed: Dec. 22, 1986

Related U.S. Application Data

[63] Continuation of Ser. No. 752,725, Sep. 21, 1984, abandoned.

[51] Int. Cl.$^4$ .............................................. B29C 53/02
[52] U.S. Cl. .................................... 264/339; 198/457; 198/470.1; 264/243; 425/397; 425/DIG. 108; 425/805
[58] Field of Search ............... 264/322, 243, 295, 310, 264/320; 425/DIG. 201, DIG. 108, 397, 126 S, DIG. 34, DIG. 219, 805; 198/457, 470.1

[56] References Cited

U.S. PATENT DOCUMENTS

| | | | |
|---|---|---|---|
| 3,107,393 | 10/1963 | Keller | 425/DIG. 201 |
| 3,365,529 | 1/1968 | Dieffenbach | 264/322 |
| 4,121,402 | 10/1978 | Cress et al. | 425/DIG. 201 |
| 4,130,936 | 12/1978 | Cottrell | 425/126 S |
| 4,311,229 | 1/1982 | Bennett | 198/457 |

Primary Examiner—James Lowe
Attorney, Agent, or Firm—Clifford A. Poff; Thomas H. Murray

[57] ABSTRACT

A conveyor-transfer apparatus for transferring artificial Christmas tree piquets (branches) from a first conveyor on which the piquets are parallel to the direction of travel of the conveyor to a second conveyor where they are arranged transverse to the direction of conveyor travel whereby their ends can be tapered. This is accomplished automatically without the use of manual labor.

3 Claims, 2 Drawing Sheets

METHOD OF TRANSPORTING AND FORMING TAPERED ENDS ON PIQUETS

This is a continuation of co-pending application Ser. No. 752,725, filed on Sept. 21, 1984, now abandoned.

BACKGROUND OF THE INVENTION

Artificial Christmas tree piquets or tree boughs can be formed, for example, by a machine such as that shown in U.S. Pat. Nos. 3,330,603 or 3,774,653 in the name of Joseph T. Geraldi as inventor. By reference to those patents, it will be seen that the piquets are formed by passing two or more wires over wire guides as they are pulled and twisted together by a rotating spiral tube, while a picker wheel inserts plastic needles in-between them. The lengths of twisted wires are then cut to predetermined sizes to make branches or boughs for artificial Christmas trees.

The piquets emerge from the aforesaid machine on a conveyor with their long axes extending parallel to the direction of movement of the conveyor. The ends of the piquets, as formed, are circular in configuration; whereas the branches or boughs of a living pine tree taper to a point. Accordingly, after the piquets emerge from the machine on which they are made, they must be placed on a second conveyor, which moves at right angles to the first, such that their opposite ends can be passed between steam-heated brushes which form a more or less tapered configuration at their ends.

In the past, the piquets on the first conveyor had to be mutually transferred to the second conveyor, a process which was tedious for workers and costly.

SUMMARY OF THE INVENTION

In accordance with the present invention, a new and improved conveyor apparatus is provided for automatically transferring piquets from a first conveyor to a second conveyor where their ends can be tapered without the use of manual labor.

Specifically, there is provided apparatus for transferring artificial tree piquets from a first conveyor at the exit end of a piquet-making machine to a second conveyor traveling at right angles to the first, the apparatus including rotary wheel means having a plurality of radially-extending fingers circumferentially spaced around its periphery. A switch is actuable by a piquet traveling along the first conveyor, the switch serving to actuate a clutch for connecting a drive motor to the rotary wheel means to rotate the same through a limited arcuate distance whereby the fingers will push a piquet from the first conveyor onto the second conveyor.

The above and other objects and features of the invention will become apparent from the following detailed description taken in connection with the accompanying drawings which form a part of this specification, and in which.

Figure 1:
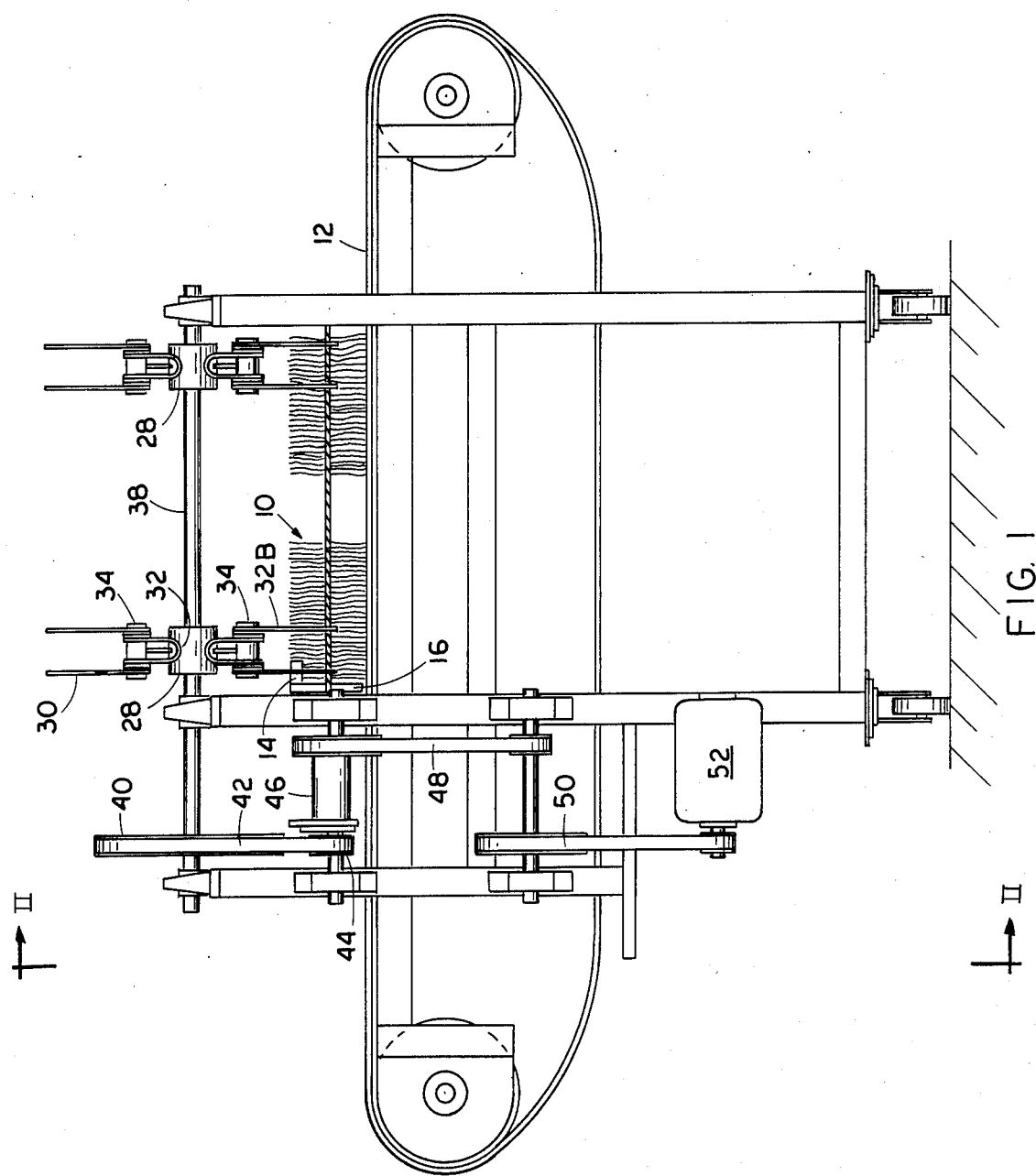
FIG. 1 is an elevational view of the conveyor-transfer apparatus of the invention.
Figure 2:
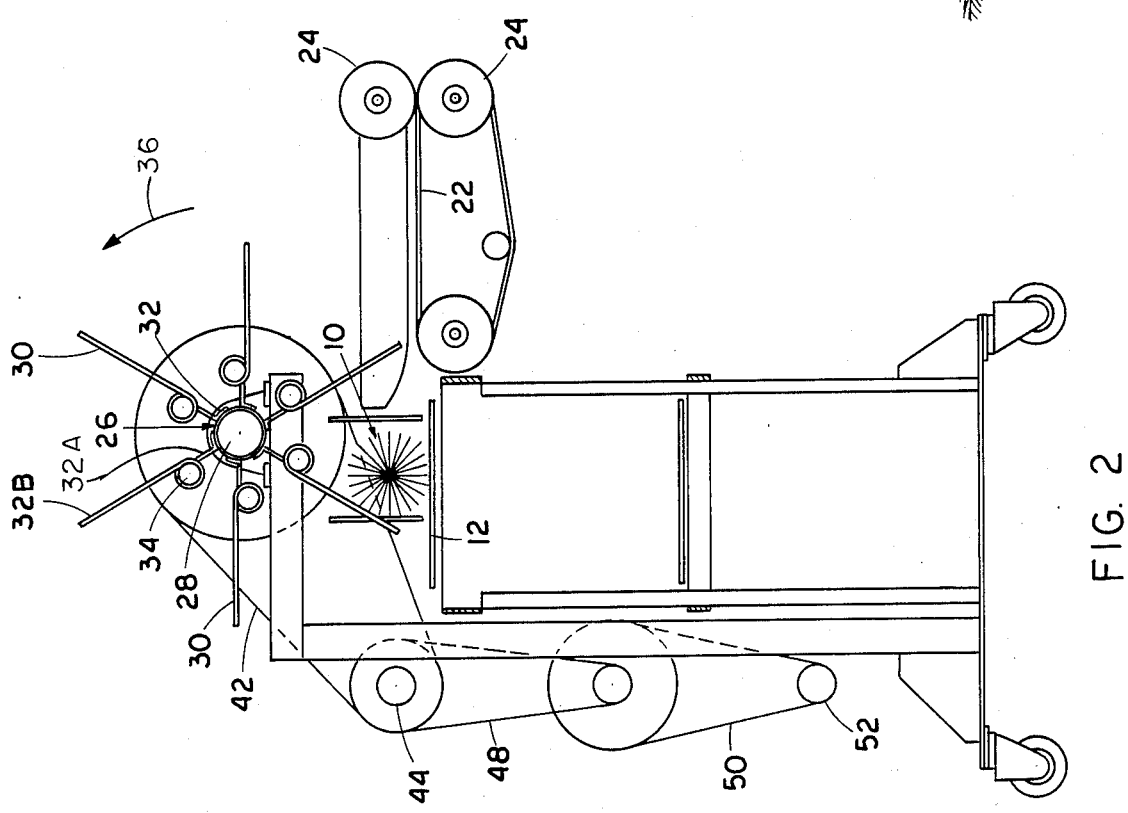
FIG. 2 is an end view of the conveyor-transfer apparatus of the invention taken substantially along line II—II of FIG. 1.
Figure 3A:
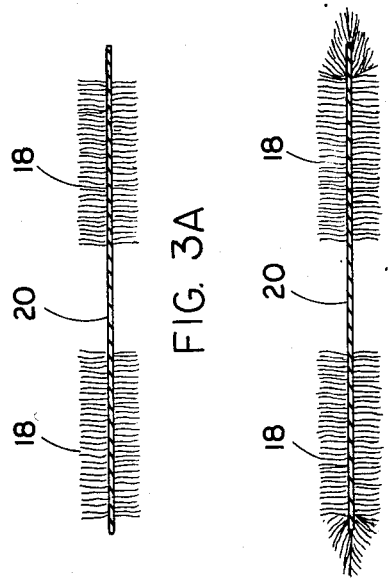
FIGS. 3A and 3B are illustrations of an artificial Christmas tree piquet before and after its ends are tapered.
Figure 3B:
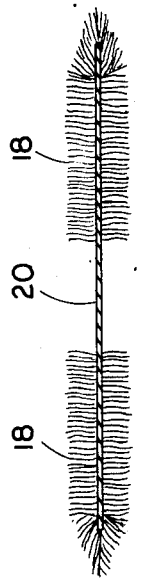

With reference now to the drawings, artificial Christmas tree piquets 10 pass along the upper reach of a conveyor 12 as they emerge from a piquet-making machine, not shown. The piquets travel on belt 12 until each one, in succession, strikes an end plate 14 which, in turn, actuates a limit switch 16. The piquets themselves are shown in FIG. 3A; and it will be noted that they comprise material 18 which has been fed between two wires 20 which are being twisted together. In the formation of the piquets, their ends are generally circular in configuration as shown in FIG. 3A; whereas it is desired to taper the ends of the piquets as shown, for example, in FIG. 3B. This is achieved by passing the ends of successive piquets between steam-heated brushes as they travel along a conveyor which moves successive piquets in a direction transverse to their longitudinal axes. This latter conveyor is indicated generally by the reference numeral 22 in FIG. 2. As the piquets travel along the conveyor 22, they pass between steam-heated rolls 24 which produce the tapered configuration at their opposite ends as shown in FIG. 3B.

It is, of course, necessary to transfer the piquets from conveyor 12, where they travel in a direction extending parallel to their longitudinal axes, to the conveyor 22 where the direction of movement is transverse to their longitudinal axes.

In order to transfer the piquets from conveyor 12 to conveyor 22, a rotary wheel means 26 is provided comprising hubs 28 which carry a plurality of radially-extending fingers 30 circumferentially spaced around the hubs. Each finger 30 comprises a generally U-shaped wire 32 having two legs 32a and 32b which are wrapped around pins 34 in a spring-wire configuration. The fingers 30 travel in the direction of arrow 36 shown in FIG. 2; and as successive ones of the piquets strike the end plate 14 and trip the limit switch 16, the hub 28 is advanced through an arc of approximately 60° whereby the spring legs 32a and 32b engage the central wire of the piquets and push it from conveyor 12 onto conveyor 22. The spring configuration of the fingers effectively transfers the piquets without damaging the same.

The hubs 28 are mounted on a shaft 38 connected to a pulley 40 which is, in turn, connected through belt 42 and pulley 44 to a clutch and brake assembly 46. The other side of the clutch and brake assembly, in turn, is connected through pulleys and belts 48 and 50 to a drive motor 52.

Whenever the end of a piquet strikes the plate 14, the switch 16 closes, thereby energizing clutch 46 to rotate the shaft 38 and the finger assemblies 30 carried thereby through approximately 60° to transfer a piquet from conveyor 12 to conveyor 22. The next succeeding piquet, when it strikes the plate 14, causes the same sequence to repeat.

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. In the method for transferring artificial tree piquets from a first conveyor at the exit end of a piquet-making machine to a second conveyor traveling at right angles to the first and for thereafter forming tapered ends on the piquets, the steps of causing formed piquets to travel on said first conveyor until they engage a limit switch at the end of said conveyor, causing rotary wheel means having radially-extending fingers circumferentially spaced around its periphery to rotate in response to actuation of said limit switch whereby the rotary wheel means will push a piquet from the first conveyor to the second conveyor, and while said piquets travel on said second conveyor forming tapered ends on the same.

2. The method of claim 1 wherein said piquets travel on said first conveyor along a direction extending parallel to their longitudinal axes and said along said second conveyor in a direction transverse to their longitudinal axes.

3. The method of claim 1 wherein said radially-extending fingers are spring loaded.

* * * * *